PETER YOUNG & NOAH DOLL.
Improvement in Washing Machines.

No. 119,069. Patented Sep. 19, 1871.

Case A.

Witnesses:
Geo. W. Raff
Andrew Choffin

Inventors:
Noah Doll 2nd
Peter Young 1st
by Job Abbott, Attorney.

AM. PHOTO-LITHOGRAPHIC CO. N.Y. (OSBORNE'S PROCESS.)

UNITED STATES PATENT OFFICE.

PETER YOUNG AND NOAH DOLL, OF ROBERTSVILLE, OHIO, ASSIGNORS TO THEMSELVES, JOHN RHODES, AND FREDERICK J. S. WAGNER, OF SAME PLACE.

IMPROVEMENT IN WASHING-MACHINES.

Specification forming part of Letters Patent No. 119,069, dated September 19, 1871.

*To all whom it may concern:*

Be it known that we, PETER YOUNG and NOAH DOLL, of Robertsville, in the county of Stark and State of Ohio, have invented certain new and useful Improvements in Washing-Machines; and that the following is a full, clear, and exact specification thereof, which will enable others skilled in the art to make and use the said invention.

Our invention relates to that class of washing-machines having a vibrating rubber acting in combination with a concave roller-bed, and operated by a treadle below the suds-box; and the first part of our invention consists in suspending the rubber upon two levers pivoted one at each side of the suds-box, and connected, by a cross-bar and rod, with a treadle pivoted under the suds-box, the several parts being so arranged as that a slight movement of the treadle is sufficient to raise or lower the rubber, as may be required, thus enabling the operator to work the treadle by the motion of his foot on the heel, and obviating the fatigue incident to former constructions, in which a considerable motion of the treadle was required to raise or lower the rubber during the operation of washing. The second part of our invention consists in suspending the rubber under the cross-heads on the rubber arms by means of two or more slotted plates secured to said heads and arms, and extending down into slots in the rubber, where they are fastened by pins driven endwise into said rubber, said rubber and cross-heads being held apart by short spiral springs or rubber blocks placed near the edges of the rubber, the object being to obtain a short elastic movement and a rocking movement for the rubber on the cross-heads without throwing any transverse strain on the elastic connections placed between the cross-heads and the rubber. The third part of our invention consists in the novel construction and attachment of the arms or links which connect the operating cross-bar to the rubber, said arms being made in two branches from near their centers, and the ends of said branches being attached to the ends of the cross-heads of the rubber arms, so that when the rubber is forced violently against any unusual thickness of clothing the strain, tending to break said cross-heads at their centers or to twist them from the rubber-arms, will be taken up by the branches of the connecting-arms, thus obviating the danger of breaking the frame.

Figure 1:
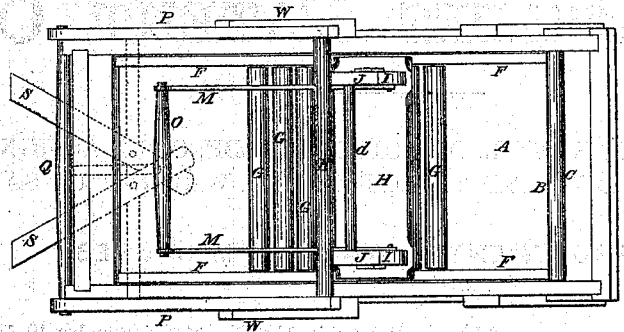
Figure 2:
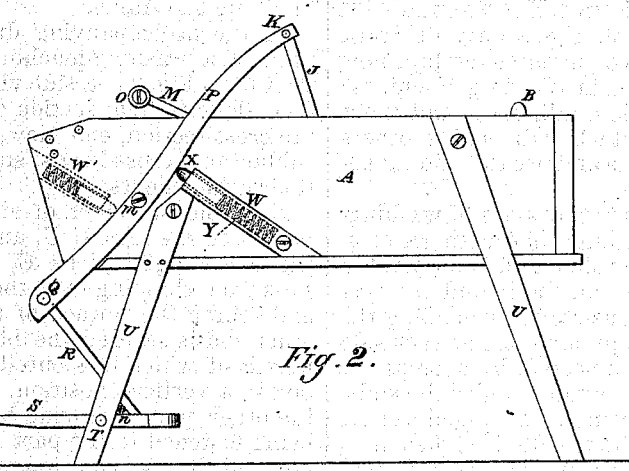
Figure 3:
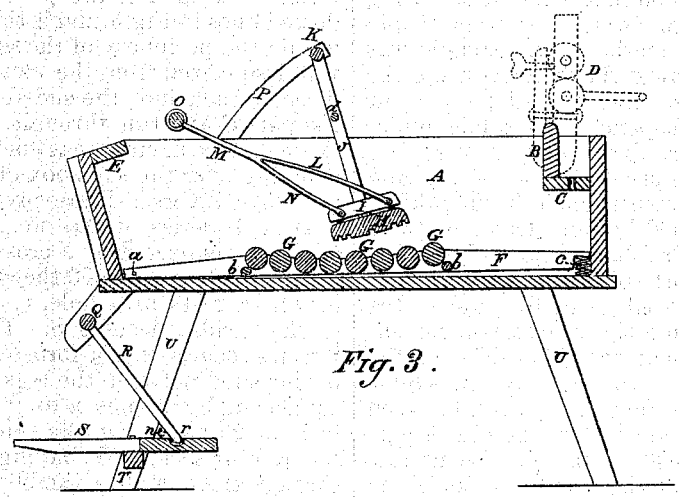
Figure 4:
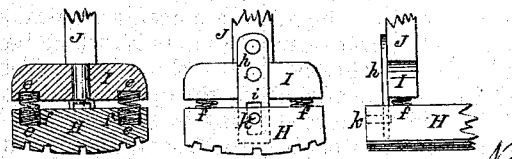

In the accompanying drawing, Figure 1 is a plan of a washing-machine embodying our invention. Fig. 2 is a side view of the same. Fig. 3 is a longitudinal section of the same. Figs. 4 are cross-section, end view, and side view of the rubber and cross-heads, showing the details of their attachments.

A is the suds-box, of an ordinary form, supported on the legs U U, and having at one end the overhanging piece E, which prevents the suds from slopping over the end of the machine and soiling the clothes of the operator. In the other end is secured the box-piece C B, the one part B of which is secured to the sides of the box in a vertical position, as shown in Fig. 3; the other part C having holes bored in it, and being fastened to the part B and the end of the box and thus serving to stiffen the part B. The clothes-wringer D, of any of the well-known forms, is secured to the part B, as indicated by dotted lines in Fig. 3, and is thus brought entirely within the periphery of the suds-box, so that any water squeezed from the clothes will either fall directly back into the suds-box or will fall onto the part C and run through the holes in it into the suds-box, in either case being prevented from dripping over the suds-box onto the floor or carpet. The levers P P are pivoted on the screws *m m* at the sides of the box A, and their lower ends are connected by a cross-bar, Q, to the center of which is attached the rod R, the lower end of which rests in a hole, *r*, at the intersection of the treadle-pieces S S. These treadle-pieces S S are secured in a V-form on the shaft T, which is journaled between the legs U U, and they are connected by staples *n* to the rod R, as shown in Figs. 2 and 3. On the sides of the box A are secured the sockets W, having holes bored nearly through them, and in the bottom of these holes are placed the spiral springs Y, on which rest the plungers X, which bear against the levers P and raise the rubber when not held down by the foot of the operator on the treadles S. These sockets may be secured to the box below the levers P and above their pivots *m*, as shown by full lines in Fig. 2; or they can be placed above said levers and below the pivots *m*, as shown by dotted lines in Fig. 2; the last being usually the preferable position, as it prevents the water from running into the holes in the sockets. The rock-shaft K is pivoted between the upper ends of the levers P P, and in it are secured the rubber-arms J J, which are connected by a cross-bar, $d$, and at the lower ends of which are the cross-heads I I. The slotted plates $h\ h$ are secured to the arms J and cross-heads I, and extend down into slots in the rubber H, which is secured to them by pins $k$ driven into the ends of said rubber through the slots $i$ in said plates. The short spiral springs or rubber blocks $f\ f$ are placed in holes $e\ e$ in the cross-heads I and rubber H, as shown in Figs. 4, from which it is seen that the rubber H has a small elastic play to and from the cross-heads I, and that it also has a rocking motion around the axial pins $k\ k$; and it is also seen that the power by which the rubber is moved over the clothes is applied to it through the plates $h\ h$, and that no strain except a compressive one is ever brought on the springs $f\ f$. The operating cross-bar $o$ is secured between the upper ends of the connecting-links M M, which fork out about half way from the bar O to the rubber H into the two branches L and N, the ends of which are attached near the ends of the cross-heads I, so that in case either edge of the rubber H is forced violently against an unusual thickness of clothing the upward force on the end of the cross-heads I is resisted by the action of one of the branches L or N and the danger of breaking said cross-head is obviated. The concave roller-frame F $b\ b$ F consists of the side pieces F F, which are united by the cross-pieces $b\ b$, and between which are journaled the rollers G G. The rear ends of the side pieces F F are pivoted on pins $a$ to the sides of the box A, or they can simply rest on the bottom of the box, if preferred, and their other ends rest on the short spiral springs or rubber blocks $c\ c$ placed on the bottom of the box, thus allowing a limited elastic vertical motion to the bed of the concave rollers.

In the practical operation of this machine the operator grasps the cross-bar O with his hands and places the fore part of one of his feet on one of the treadles, and by pressing on the treadle forces the rubber H down on the clothing on the concave G G as he moves it back and forth by the cross-bar O. The arms of the levers P between the pivots $m$ and rock-shaft K being considerably longer than the other arms of said levers, it is seen that a slight movement of the treadles S is sufficient to allow the rubber H to be raised by the springs Y, or to force it down onto the clothing, as it is also seen that the spring motion allowed the concave G G and rubber H by the springs $c$ and $e\ e$ will allow the rubber to move over any ordinary inequalities in the thickness of the clothing on the concave without any movement of the treadles S.

We lay no claim to the use of branched connecting-links M N L for uniting the cross-bar handle O to the vibrating rubber J H J, except when the branches L N of said links are attached to the ends of the cross-heads I on the standards J, beneath which the rubber H is placed.

What we claim as our invention, and desire to secure by Letters Patent, is—

1. The levers P P, in combination with the vibrating rubber K J H, cross-bar Q, rod R, and pivoted treadle S, the several parts being arranged substantially as and for the purpose specified.

2. The sockets W having the spring Y and plungers X arranged therein, in combination with the pivoted levers P P having the vibrating rubber K J H between their upper ends, the several parts being arranged substantially as and for the purpose specified.

3. The slotted plates $h\ h$ and springs or rubbers $e\ e\ e\ e$, in combination with the rubber-arms J J, and rubber H having the axial pins $k\ k$ therein, the several parts being arranged substantially as and for the purpose specified.

4. The connecting-links M M with the cross-bar O secured between their upper ends, and with their branches L N L N attached to the ends of the cross-heads I I, substantially as and for the purpose specified.

5. The combination of the concave roller-frame F G F having an elastic movement at one end, vibrating rubber K J H having an elastic movement between the rubber H and arms J J, cross-bar O, and branched arms M N L, levers P P, sockets W W with springs Y and plungers X, cross-bar Q, rod R, and pivoted treadles S, the several parts being arranged as and for the purpose specified.

As evidence of the foregoing witness our hands this 18th day of July, A. D. 1871.

PETER YOUNG.
NOAH DOLL.

Witnesses:
J. J. DELAP,
J. SHENGLE. (117.)